United States Patent [19]

Yoshizumi et al.

[11] Patent Number: 5,144,150
[45] Date of Patent: Sep. 1, 1992

[54] CONFIGURATION MEASURING APPARATUS

[75] Inventors: Keiichi Yoshizumi, Osaka; Keishi Kubo, Moriguchi, both of Japan

[73] Assignee: Matsushita Electric Industrial Co., Ltd., Osaka, Japan

[21] Appl. No.: 665,224

[22] Filed: Mar. 6, 1991

[30] Foreign Application Priority Data

Mar. 7, 1990 [JP] Japan .................................. 2-55330

[51] Int. Cl.[5] .............................................. G01B 9/02
[52] U.S. Cl. ..................................... 250/561; 356/358
[58] Field of Search ............... 250/561, 306, 307, 560, 250/201.3, 234; 356/376, 357, 355, 358

[56] References Cited

U.S. PATENT DOCUMENTS

| | | |
|---|---|---|
| 4,611,916 | 9/1986 | Yoshizumi . |
| 4,717,255 | 1/1988 | Ulbers ............................ 356/358 |
| 4,724,318 | 2/1988 | Binnig . |
| 4,776,699 | 10/1988 | Yoshizumi . |
| 4,818,110 | 4/1989 | Davidson ........................ 356/358 |
| 4,880,975 | 11/1989 | Nishoka et al. ................... 250/306 |
| 4,916,324 | 4/1990 | Meier ............................... 250/561 |
| 5,017,010 | 5/1991 | Mamin et al. .................... 356/358 |

OTHER PUBLICATIONS

"Ultrahigh Accuracy 3-D Profilometer"—Applied Optics, vol. 26, No. 9, issued May 1, 1987—by Keiichi Yoshizumi et al.

*Primary Examiner*—Janice A. Howell
*Assistant Examiner*—Kiet T. Nguyen
*Attorney, Agent, or Firm*—Wenderoth, Lind & Ponack

[57] ABSTRACT

A configuration measuring apparatus includes a contacting member for contacting and tracing a surface of an object to be measured, a supporting member for supporting the contacting member and having a reflecting surface, an optical probe, a driving device, and an X-coordinate or XY-coordinate measuring device. The optical probe supports the contacting member through the supporting member and has an automatic focusing device for moving an objective lens in the Z-direction, which is an optical direction of the lens, so that a focusing point of the objective lens is positioned at the reflecting surface in spite of a possible dislocation of the reflecting surface, which is to be at a focusing position of the objective lens for condensing a laser beam and a device for measuring a Z-coordinate of the reflecting surface by allowing interference of the laser beam which has been reflected by the reflecting surface with a reference light. The driving device moves the optical probe in the X-direction or the XY-direction. The X-coordinate or XY-coordinate measuring device measures a position of the optical probe in the X-direction or the XY-direction. Then, the configuration of the surface of the object in XZ-coordinate or XYZ-coordinate is measured by the optical probe in cooperation with the contact member which traces the surface of the object.

6 Claims, 5 Drawing Sheets

CONFIGURATION MEASURING APPARATUS

BACKGROUND OF THE INVENTION

The present invention relates to an apparatus for measuring the configuration of a fine flat surface two-dimensionally or three-dimensionally in a wide dynamic range, and more particularly to an apparatus for measuring the precise configuration of a free curved surface such as the surface of an aspherical lens, the configuration of the fine pattern of a semiconductor, and the configuration of a Fresnel lens having fine steps such as a grating formed on the curved surface thereof.

It is impossible for an interferometer or a conventional contact type three-dimensional configuration measuring apparatus to measure the configuration of a free curved surface such as that of an aspherical lens to the accuracy of a sub-micron to 10 nm. In order to overcome this problem, Japanese Laid-Open Patent Publications No. 57-189761 (corresponding to U.S. Pat. No. 4,611,916) and No. 60-148715 (corresponding to U.S. Pat. No. 4,776,699) have disclosed an optical measuring apparatus for measuring the configuration of an aspherical surface and a free curved surface with a high accuracy. These apparatuses comprise an optical probe for measuring the configuration of an object surface by means of lights which have been condensed on the object surface and reflected thereby.

According to the above optical apparatus, the resolving power is limited in the horizontal direction of a spot because lights are condensed on the object surface. Therefore, the configuration of the surface of an area as accurate to not more than 1 μm cannot be measured. In addition, since the configuration of the object surface is measured by means of lights reflected by the object surface, the apparatus is incapable of measuring the configuration of a surface coated with a film of a nonreflective material. This problem depends on a principle of the optical apparatus.

In order for a contact type measuring apparatus to measure the configuration of an object surface with a high accuracy, it is necessary to consider not only the straightness of an object placing stage, and the accuracy and position of a scale, but also the contact pressure between the object surface and a probe, or a pin which contacts the object surface. It is necessary to provide the apparatus with a probe having a radius of curvature not more than 0.1 μm to measure the object with resolving power of as fine as 0.1 μm in a horizontal direction. In order for the probe not to deform the object surface, the contact pressure is required to be not more than approximately 30~100 nN (3~10 μg) depending on the material of the surface of an object.

The above-described contact pressure range cannot be obtained by a conventional probe due to its unfavorable mass and the unfavorable constant of a spring. That is, if a contact pressure is chosen according only to the weight of the probe, the amount of diamond mounted on the lower end portion of the probe and used as the contact pin is as small as 0.1 mm³. If a tungsten leaf spring of 13 μm in thickness, 0.25 mm in width, and 3 mm in length is used to support the probe, the constant thereof is 1 N/m. A force of 30 nN is required to be applied to the leaf spring to flex it 30 nm. It is extremely difficult to keep the contact pressure constant because the probe is required to move in conformity with the object surface which is irregular. Because of the above reason, it is very difficult for the probe-provided conventional apparatus to measure the configuration of the object surface under a small contact pressure.

In order to measure the object surface of a precise configuration, there is provided a scanning type tunnel microscope which actively controls the pin position of the probe based on the quantity of tunnel current which flows through the object surface. But the microscope is used to measure a surface composed of limited kinds of metals and the range to be measured thereby at a time is very small, because a piezo element is used to control the pin position.

SUMMARY OF THE INVENTION

It is the essential object of the present invention to provide an apparatus for measuring an object surface capable of measuring the configuration of the following surfaces with a higher accuracy than the conventional apparatuses and without damaging the surfaces: a surface of a very precise configuration; a surface unmeasurable by a non-contact type optical measurement; and a surface covered with a coating film of nonreflective material.

In accomplishing these and other objects, according to one aspect of the present invention, there is provided a configuration measuring apparatus comprising: a contacting member for contacting and tracing a surface of an object to be measured; a supporting member for supporting the contacting member and having a reflecting surface; an optical probe supporting the contacting member through the supporting member and having automatic focusing means for moving an objective lens in the Z-direction, which is an optical direction of the lens, so that a focusing point of the objective lens is positioned at the reflecting surface of the supporting member in spite of a possible dislocation of the reflecting surface of the supporting member which is to be at a focusing position of the objective lens for condensing a laser beam and means for measuring a Z-coordinate of the reflecting surface of the supporting member by allowing interference of the laser beam which has been reflected by the reflecting surface of the supporting member with a reference light; driving means for moving the optical probe in the X-direction or the XY-direction; and X-coordinate or XY-coordinate measuring means for measuring a position of the optical probe in X-direction or XY-direction; wherein configuration of the surface of the object in XZ-coordinate or the XYZ-coordinate is measured by the optical probe in cooperation with the contact member which traces the surface of the object.

A spring or a slide mechanism can be used as the supporting member movable in the Z-direction.

According to the above construction, the contact member is mounted on the optical probe. Therefore, irrespective of the degree of the change of the contact member in the Z-direction, the automatic focusing function allows the optical probe to follow the contact member while the contact member is tracing the object surface. Therefore, the distance from the optical probe to the contact member is constant.

Accordingly, when a spring is used as the supporting member, the flexure quantity thereof is constant. Consequently, a large object surface can be traced with a very light constant contact pressure.

When the slide mechanism is used as the supporting member, the slide stroke of the slide mechanism is short, which enables the use of a very light slide mechanism.

Therefore, a large object surface can be traced with a very light constant contact pressure.

The XZ-coordinate or the XYZ-coordinate of the object surface, namely, the configuration of the object surface can be measured by the tracing of the object surface to be carried out by the contact member mounted on the optical probe.

BRIEF DESCRIPTION OF THE DRAWINGS

The above and other objects and features of the present invention will become clear from the following description taken in conjunction with the preferred embodiments thereof with reference to the accompanying drawings, in which.

DETAILED DESCRIPTION OF THE INVENTION

Figure 1:
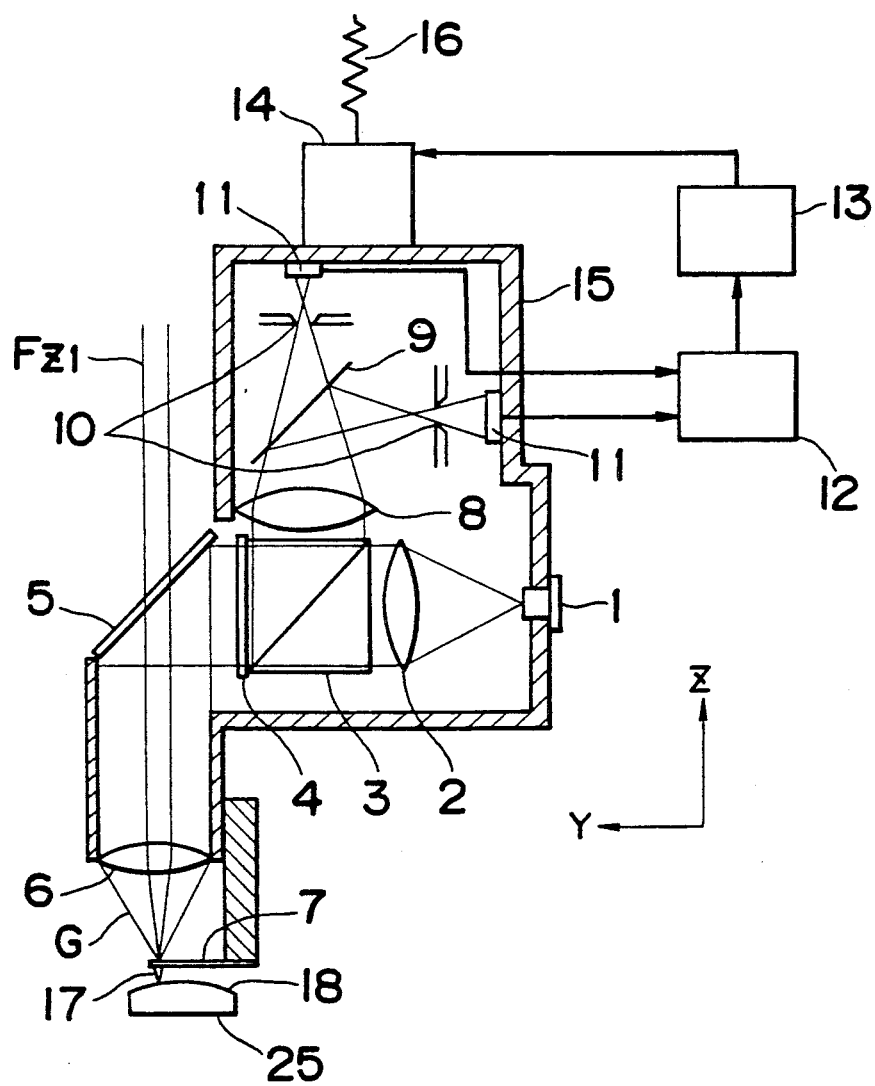
FIG. 1 is a view for describing the essential parts of an apparatus according to an embodiment of the present invention.

Before the description of the present invention proceeds, it is to be noted that like parts are designated by like reference numerals throughout the accompanying drawings.

Figure 2:
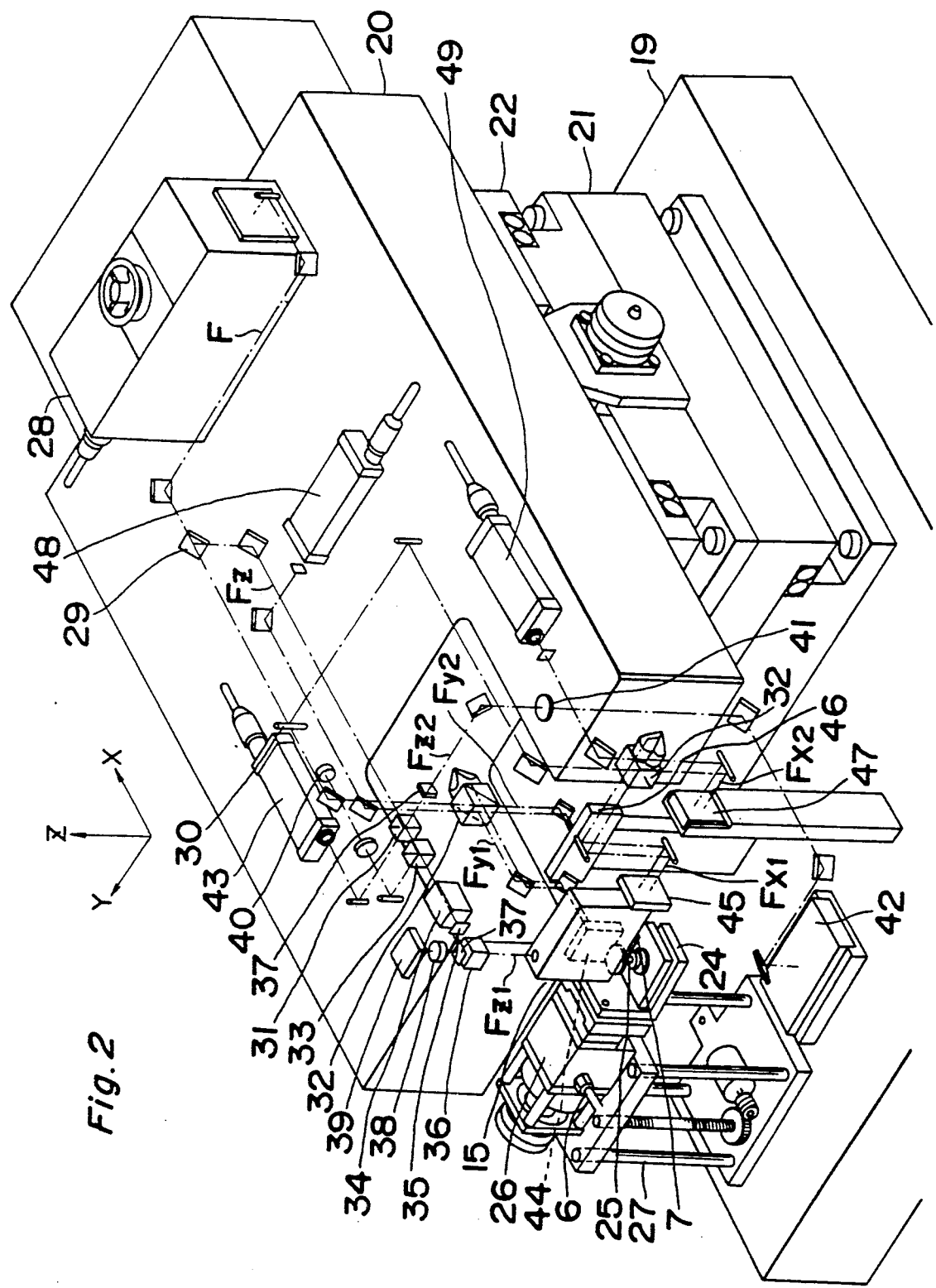
FIG. 2 is a view showing the entire construction of the mechanism of the apparatus shown in FIG. 1.

Referring to FIGS. 1 and 2, a configuration measuring apparatus according to an embodiment of the present invention is described below. The apparatus comprises a precision three-dimensional measuring device and a contact probe mounted thereon. The apparatus is described in Japanese Laid-Open Patent Publications No. 57-189761 (corresponding to U.S. Pat. No. 4,611,916) and U.S. Pat. No. 60-148715 (corresponding to U.S. Pat. No. 4,776,699) filed by the present applicant.

Referring to FIG. 2 showing the entire construction of the apparatus, the apparatus comprises a lower base 19. An upper base 20 is movable in the XY-direction via an X-direction table 21 and a Y-direction table 22, both provided between the lower base 19 and the upper base 20. A Z-direction moving section 15 is provided on the front face of the upper base 20 and supported to be movable in the Z-direction. An L-shaped holding base 24 is for holding an object 25 to be measured. A rotary section 26 comprising a motor for rotating the holding base 24 about an axis (not shown) provided in the Y-direction, an air cylinder, and a rotary encoder for detecting the angle of rotation of the above axis. A pivots base 27 pivotal about an axis (Q) (not shown) provided in the Z-direction, and supports the rotary section 26 so that the rotary section 26 is vertically movable in FIG. 2.

Referring to the Z-direction moving section 15 shown in FIG. 1, a light beam (G) emitted by a semiconductor laser 1 passes through a collimator lens 2, a polarization beam splitter 3, and a quarter-wavelength plate ($\lambda$/4 plate) 4, and then is reflected by a dichroic mirror 5 and condensed on a leaf spring 7 by an objective lens 6.

If the reflecting surface of the leaf spring 7 inclines, a part of the reflected laser beam (G) is not incident on the objective lens 6, while the rest of the reflected laser beam (G) is incident on the objective lens 6. The optical system of this apparatus allows the configuration measurement of the object surface 18 by the reflected light of the laser beam (G) or a measuring light Fz1 which has been condensed directly on the object surface 18 and reflected thereby. The measuring light Fz1 is described later. The reflecting surface of the leaf spring 7 is unlikely to incline greatly. Owing to an inclination correcting servo function of the apparatus which is described later, even though the reflecting surface of the leaf spring 7 inclines $\pm 30°$ in any direction, a required amount of light is incident on the objective lens 6.

The laser beams (G) reflected by the surface of the leaf spring 7 pass through the objective lens 6, are then totally reflected by the dichroic mirror 5 and the polarizing prism 3, and thereafter condensed with a lens 8. Then, the laser beams (G) are separated into two by a half mirror 9 and are pass through pin holes 10, and received by two photodetectors 11. According to the difference between the outputs from the two photodetectors 11, a focus error signal is generated by a focus error signal generating section 12. A linear motor 14 is controlled so that a driving circuit 13 makes the level of the focus error signal zero, and the Z-direction moving section 15 is moved in Z-direction. The dead weight of the Z-direction moving section 15 is supported by a spiral spring 16.

Figure 4:
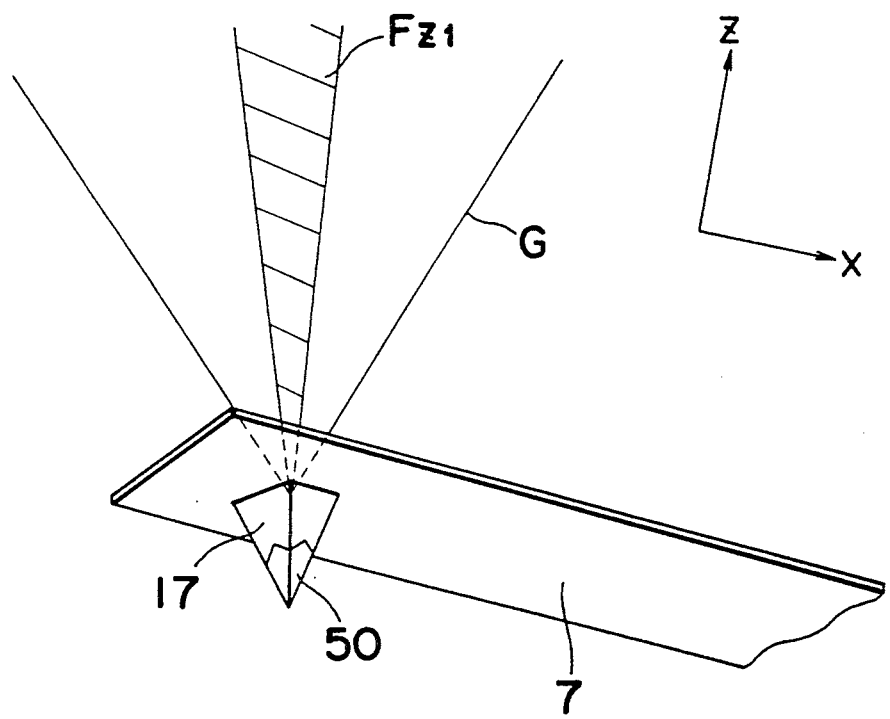
FIG. 4 is an enlarged view showing a measuring pin, i.e. probe, of the apparatus.

The leaf spring 7 is as thin as 10 $\mu$m. The upper surface thereof for reflecting light is polished to a mirror-like surface finish. Referring to FIG. 4, the leaf spring 7 is provided on the lower surface thereof with a pin 17 serving as a contact member having a lower portion 50 consisting of diamond polished to a degree of approximately 0.1 $\mu$mR. The optical system is moved upward or downward by the focusing servo function of the apparatus. That is, when the object 25 is not on the holding base 24, the pin 17 is at a position several micrometers downward with respect to the focusing position by gravity. When the object 25 is on the holding base 24, the lower end of the pin 17 contacts the object surface 18. Then, the optical system moves upward or downward by the focusing servo function so that the objective lens 6 moves to the focusing position. Therefore, the distance from the objective lens 6 to the upper surface of the leaf spring 7 is maintained constant. The Z-coordinate measurement of the object surface 18 is carried out by the measuring light Fz1 which is condensed on the surface of the leaf spring 7. The measuring light Fz1 and the laser beam (G) are condensed on approximately the same position of the leaf spring 7.

Figure 3:
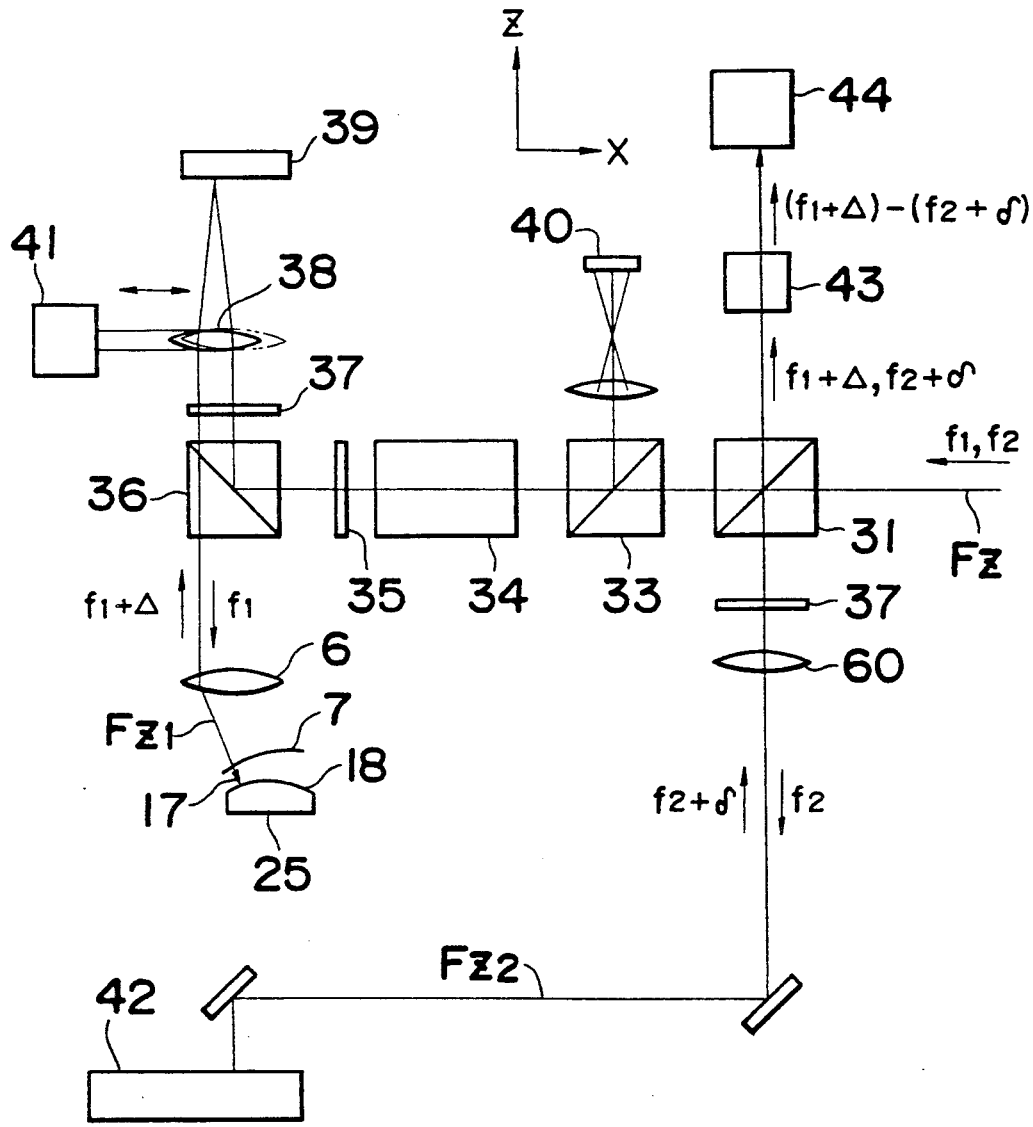
FIG. 3 is a view showing the principle of the Z-direction measuring optical system of the apparatus.

The principle of measuring the object surface 18 in XYZ-coordinate utilizing a He-Ne Zeeman laser beam (F) will be described below. A part of the laser beam (F) irradiated from a He-Ne frequency stabilizing Zeeman laser 28 which oscillates at two frequencies f1 and f2 passes through a first half mirror 29 and are separated from each other by a second half mirror 30, thus being used as lights for measuring the X and Y coordinates of a point of the object surface 18 being measured. As shown in FIG. 3, the rest of the laser beam Fz reflected by the first half mirror 29 is separated into the measuring light Fz1 and a reference light Fz2 by a polarizing prism 31. The measuring light Fz1 and the reference light Fz2 are linearly polarized at a right angle with each other. The frequency f1 of the measuring light Fz1 and the frequency f2 of the reference light Fz2 differ from each other by hundreds of kilohertz. Laser beams Fx and Fy to be used to measure the X and Y coordinates of the object surface 18 are each separated into a measuring light Fx1 and a reference light Fx2 and a measuring light Fy1 and a reference light Fy2.

As shown in FIG. 3, the measuring light Fz1 to be used to measure the Z-coordinate of the object surface 18 passes through a special polarizing prism 33 which transmits a P-polarized wave totally and an S-polarized wave partially, a Farady element 34, and a halfwave plate 35, and is S-polarized and is then totally reflected by a polarizing prism 36. Then, the light Fz1 passes through a quarter wavelength plate 37 and a condenser lens 38, and is condensed on a mirror 39. The light Fz1 reflected by the mirror 39 is P-polarized by the quarter wavelength plate 37 and totally passes through the polarizing prism 36, thus being incident on the objective lens 6. Then, the light Fz1 is condensed on the leaf spring 7 at a right angle therewith.

The light Fz1 reflected by the leaf spring 7 returns along the same optical path as that of the incident light and is S-polarized. Then, the light Fz1 is partially reflected by the special polarizing prism 33 and totally reflected by the polarizing prism 31, thus reaching a Z-axis photodetector 43. When the configuration of the object surface 18 is measured, the pin 17 and the leaf spring 7 functioning as the reflecting surface move vertically in FIG. 1 according to the fluctuation of the Z-coordinate of a point of the object surface 18 being measured, namely by the vertical movement of the Z-direction moving section 15. The frequency of the reflected light is Doppler-shifted according to the moving speed of the pin 17 and the leaf spring 7, thus becoming $(f1+\Delta)$.

Owing to the operation of the inclination correcting servo function of the apparatus, the reflected light returns along the same optical path as that of the incident light. That is, if the leaf spring 7 inclines, the light partly reflected by the special polarizing prism 33 is detected by a quarter-sectioned photodetector 40. The condenser lens 38 is moved in the XY-direction by a condenser lens moving means 41 so as to change the optical path of the light which will be incident on the objective lens 6.

The reference light Fz2 is totally reflected by the polarizing prism 31 and passes through a lens 60, and is then, condensed on a Z-axis mirror 42. The reference light Fz2 reflected by the Z-axis mirror 42 reaches the Z-axis photodetector 43 through the lens 60, the quarter wavelength plate 37, and the polarizing prism 31. The frequency of the reflected light becomes $(f2+\delta)$ owing to the straightness error generated by the movement of the X table 21 and the Y table 22. Therefore, the Z-axis photodetector 43 detects a beat signal, the frequency of which is $(f1+\Delta)-(f2+\delta)$. As a result, a Z-axis detecting device 44 exactly detects the Z-coordinate of the leaf spring 7 corresponding to a point of the object surface 18 being measured. Since the above $\Delta$ contains the component $\delta$ which is the straightness error, the detected value does not include an error generated by the lack of the straightness error generated by the movement of the X and Y tables 21 and 22.

The X and Y coordinates of the point being measured are detected by X-axis and Y-axis photodetectors 48 and 49, respectively. That is, the X-axis photodetector 48 detects the difference between the frequency of the reflected light of the measuring light Fx1 and the frequency of the reflected light of the reference light Fx2. The Y-axis photodetector 49 detects the difference between the frequency of the reflected light of the measuring light Fy1 and the frequency of the reflected light of the reference light Fy2. The measuring lights Fx1 and Fy1 are irradiated to the X-axis mirror 44 and the Y-axis mirror 45, respectively mounted on the Z-direction moving section 15. The reference lights Fx2 and Fy2 are irradiated to the X-axis mirror 46 and the Y-axis mirror 47, respectively mounted on the lower base 19.

The pin 17 of the embodiment will be described referring to FIG. 4. The pin 17 comprising a metal is adhered to the lower surface of the leaf spring 7 which is 12 mm in length, 0.25 mm in width, and 12.7 μm in thickness. The lower end portion 50 of the pin 17 consists of diamond, the radius of curvature of which is 0.1 μm.

The constant (k) of the leaf spring 7 comprising tungsten is expressed as follows:

$$k = (Ebh^3)/(4l^3)$$

where E is Young's modulus; l is the length of the leaf spring 7; b is its width, and h is its thickness. E is $2.0 \times 10^{11} \text{N/m}^2$.

Therefore, $k = 15 \times 10^{-3} \text{N/m} = 15 \text{ nN/}\mu\text{m}$

When the object surface 17 is vertically moved 1 μm, the contact pressure between the leaf spring 7 and the object surface 18 changes 15 nN in the case of even a very soft spring. Under the influence of the focusing servo function on the surface of the leaf spring 7, the change of the contact pressure is in the range within as small as 15 nN $\times 0.02 = 0.3$ nN because the follow-up accuracy of the focusing servo function is approximately ±0.02 μm. As shown below, the surface of a soft material such as a resin can be measured at a contact pressure in this range without transforming the material.

The relationship between the transformation amount of an object surface and the radius of curvature of the lower end portion of a contact pin as well as the contact pressure between the object surface and the pin is described below. When the pin, the radius of curvature of which is $1/\rho$ contacts the object surface at contact pressure of (P), the transformation amount δ of the object surface is expressed as follows according to a book entitled as "Accurate Measurement (1)" written by Yasuo Aoki; published by Corona Co., Ltd. on Nov. 15, 1968; page 23:

$$\delta = \left( \frac{9}{512} (\theta_1 + \theta_2)^2 \cdot \Sigma\rho \cdot P^2 \right)^{\frac{1}{3}}$$

where $\theta = 4(1-\sigma^2)/E$; $\sigma$ is Poisson's ratio; $\theta_1$ is elastic modulus of the pin; $\theta_2$ is elastic modulus of the object surface; $\Sigma\rho$ is $2 \times 10^7$ which is the addition of the curvature of the pin in the X-direction and the Y-direction; and P is the contact pressure. Since diamond is much harder than the object surface 18, $\theta_1$ can be set to 0.

The transformation amount δ of a hard object surface consisting of steel and a soft object surface consisting of polyethylene is found as shown below. According to "Rika Nenpyo" edited by Tokyo Tenmondai, published by Maruzen Kabushiki Kaisha, Young's modulus E of steel is $2 \times 10^{11}$ and Poisson's ratio $\sigma$ thereof is 0.3. Young's modulus E of polyethylene is $7.6 \times 10^8$ and Poisson's ratio $\sigma$ thereof is 0.46. Substituting these values into the above equation, the transformation amount of steel is 0.8 nm supposing that contact pressure is 1 $\mu N$ and the transformation amount of polyethylene is 0.5 nm assuming that contact pressure is 10 nN. A damage to the object surface 18 or a measurement error due to a transformation in this extent does not have an influence on the configuration measurement of the object surface 18.

The configuration of the lower end portion and radius of curvature of the pin and the size and material of the leaf spring are selected according to an object.

Figure 5:
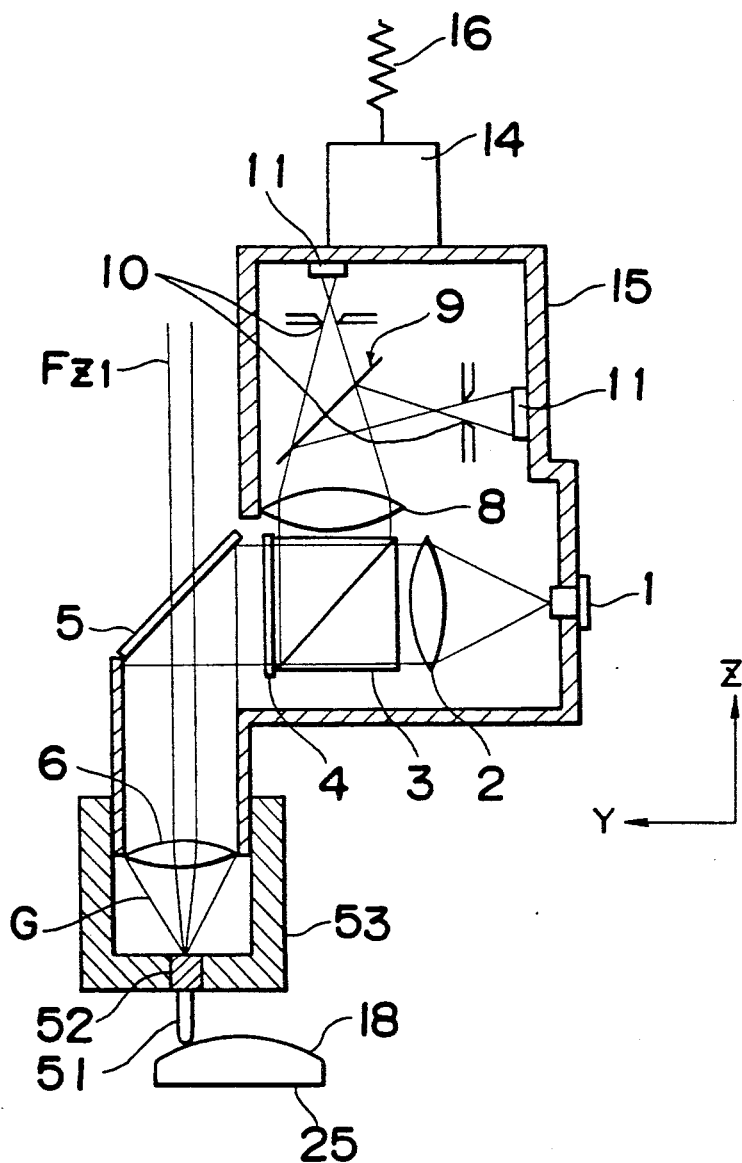
FIG. 5 is a view for describing the essential parts of an apparatus according to another embodiment of the present invention.

The lower end portion of the pin according to another embodiment will be described below with reference to FIG. 5.

A pin 51 having a semispherical lower surface is mounted on a lower portion of the Z-direction moving section 15 via a mounting section 53 such that the pin 51 is movable in the Z-direction. There is provided on the upper portion of the pin 51 a slide section 52 movably supported in the Z-direction by a front surface mounting section 53. The upper surface of the slide section 52 is polished to a mirror-like surface finish. While the configuration of the object surface 18 is measured, the laser beam (G) and the frequency stabilizing He-Ne Zeeman laser beam Fzl are condensed on the upper surface of the slide section 52. The object surface 18 is traced by the pin 51 at a constant contact pressure. Thus, the configuration of the object surface 18 is measured.

In addition to the convex aspherical lens in the above embodiment, configurations of various object surfaces can be measured. For example, the surface configuration of a fine integrated circuit can be measured.

The apparatus according to the present invention having the above construction and operation is capable of measuring the configuration of the following surfaces with a higher accuracy than conventional apparatuses and without damaging the surfaces: a surface of a very precise configuration; a surface unmeasurable by a non-contact type optical measurement; a surface covered with a coating film which does not reflect a light; and an electrically insulated surface, the configuration of which cannot be measured by a Scanning Tunnel Microscope or an electronic microscope. Accordingly, the apparatus is effectively utilized in industry to measure the configuration of an object surface.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A configuration measuring apparatus, comprising:
    a contacting member for contacting and tracing a surface of an object to be measured;
    a supporting member for supporting said contacting member, said supporting member having a reflecting surface;
    an optical probe supporting said contacting member by supporting said supporting member, said optical probe comprising
        an objective lens having an optical direction extending in the Z-direction of an orthogonal XYZ coordinate system and an automatic focusing means for moving said objective lens in the Z-direction so that a focusing point of said objective lens is maintained positioned at said reflecting surface of said supporting member even if said reflecting surface of said supporting member is dislocated, and
        means for measuring a Z-coordinate of said reflecting surface of said supporting member by allowing interference of a laser beam reflected by said reflecting surface of said supporting member with a reference light;
    driving means for moving said optical probe in at least the X-direction of the X and Y-direction of said XYZ coordinate system; and
    means for measuring the position of said optical probe in at least the X-direction of the X and Y-directions of said XYZ coordinate system;
    wherein the configuration of the surface of the object in at least the X and Z-direction of the XYZ coordinate system can be measured using said optical probe with said contact member for tracing the surface of the object.

2. The configuration measuring apparatus of claim 1, wherein said driving means moves said optical probe in both the X and Y-directions and said means for measuring the position of said optical probe measures the position in both the X and Y-directions so that the configuration of the surface of the object can be measured in each of the X, Y and Z-directions of the XYZ coordinate system.

3. The configuration measuring apparatus of claim 1, wherein said supporting member is composed of a spring.

4. The configuration measuring apparatus of claim 3, wherein said spring is a leaf spring with first and second opposite surfaces, said contacting member being supported by said first surface and said reflecting surface being said second surface.

5. The configuration measuring apparatus of claim 1, wherein said supporting member comprises a slide mechanism slidable relative to said optical probe.

6. The configuration measuring apparatus of claim 5, wherein said slide mechanism has an upper surface comprising said reflecting surface and an opposite, lower surface supporting said contacting member, a mounting section slidably mounting said slide mechanism to said optical probe.

* * * * *